Patented Feb. 12, 1924.

1,483,413

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS FOR THE SYNTHETIC PRODUCTION OF AMMONIA.

No Drawing. Application filed April 2, 1921. Serial No. 458,019.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes for the Synthetic Production of Ammonia, of which the following is a specification.

This invention relates to an improved process for the synthetic production of ammonia wherein is utilized a novel purifying agent for removing impurities from the gases to be synthesized before passing the same into contact with a catalyst for the synthesis of ammonia.

One object of the invention concerns the improvement of the synthetic production of ammonia generally by the utilization of an improved drying agent adapted to remove certain impurities from the gases to be synthesized, such for example as the traces of moisture normally present therein.

Other objects and advantages of the invention have to do with the method of preparing the improved drying agent, and certain novel details of operation and process steps as will be more fully set forth in the detailed description to follow.

In the process of ammonia synthesis, as effected by use of a catalytic agent, the gases to be synthesized, comprising nitrogen and hydrogen in proportions to combine with the formation of ammonia, are first caused to traverse a chamber or series of chambers containing one or more purifying agents adapted to remove substances liable to deleteriously affect the catalyst. This step in the synthetic process is rendered necessary by reason of the fact that it is impossible to produce absolutely pure nitrogen and hydrogen upon a commercial scale except at a price which would prohibit the commercial use of the same. Among the principal impurities contained in these gases which injuriously affect catalysts containing an alkali or alkali earth metal cyanid or cyanamid are oxygen and water.

In the elimination of these impurities it may be advisable to employ two or more purifying agents since substances capable of completely removing one of the impurities are not generally capable of fully and completely freeing the combined gases from the other.

After thus purifying the gases to be synthesized they are conducted into contact with a catalyst such for example as a specially prepared material containing an alkali or alkali earth metal cyanid or cyanamid, under suitable conditions of temperature and pressure to most efficiently synthesis the gases to form ammonia. The catalytic material is preferably placed in a working autoclave to facilitate the maintenance of proper conditions of temperature and pressure. While the conditions of temperature and pressure vary somewhat, dependent upon the particular catalyst employed, they preferably range between 300° and 600° C. with pressures of from 10 to 100 atmospheres. On passing from the working autoclave the gases are suitably treated to remove the ammonia formed during the synthesizing operation, but traces of the ammonia will remain in the uncombined gases which are reconveyed to the system to be mixed with the initially received nitrogen-hydrogen mixture and again passed through the purifying agents and into contact with the catalyst for further synthesis. The traces of ammonia remaining in the uncombined gases exert, however, no deleterious effect upon the catalyst but may under certain circumstances serve to regenerate the catalyst.

I have found that a particularly efficient drying agent for removing traces of water vapor from the uncombined gases may be prepared in the following manner.

A carbonate or acid carbonate of an alkalinous metal, such for example as calcium carbonate, barium carbonate or strontium carbonate, is mixed with carbon, such for example as charcoal or coke, and a catalytically active metal, such as iron, manganese or chromium, and the materials treated in such a manner as to change the alkalinous metal carbonate to a carbo-nitrid compound which serves to readily combine with the moisture in the gases.

In the preparation of the purifying agent, the metal employed, which may be iron, manganese or chromium, or other catalytically active metals, or oxids of such metals, although I prefer to use iron or iron oxid, is ground to a fine powder, preferably of sufficient fineness to pass through a sixty or one hundred mesh sieve, and is then thoroughly mixed with the carbon such as coke or charcoal and again passed through the grinding mill to reduce all parts of the mixture to a finely divided form and at the same time insure an intimate and uniform mixture of the materials. Substantially equal parts by weight of the metal and carbon may be employed, although the proportions are subject to variation with the particular metal used and also depending upon whether or not the metal is used in the form of an oxid or carbonate. After the mixture of metal and carbon has been prepared as above described a suitable quantity of the alkalinous metal carbonate is added, and the resultant mass thoroughly mixed together. For the purpose of illustration it will be assumed that barium carbonate is to be used, in which case the proportions of the various substances used may be as follows by weight: 80 parts iron, 40 parts carbon and 80 parts barium carbonate. When iron oxid or iron carbonate is substituted for the metallic iron the proportions of iron and carbon may be varied somewhat, and the proportion of iron may if desired be increased to the extent of using 80 parts of iron, from 20 to 40 parts of carbon and from 20 to 40 parts of alkalinous metal carbonate, if the carbonate employed is sufficiently effective as a binder to hold the increased proportion of iron against breaking down. The proportions of carbon and carbonate may also be varied somewhat as indicated above, dependent upon the nitrifying agent used.

The mixture of materials above described is then treated with water to form a dough like mass which is then immediately formed into briquets of suitable size and shape for use. The briquets may be readily formed by passing the mass through a power driven meat grinder having a plurality of openings of circular or angular form suitably arranged for forcing the material therethrough. The size of the openings is preferably such as to give briquets of approximately one-fourth inch in diameter, and means is provided for cutting the briquets into lengths of approximately one-inch, as the material emerges from the grinder. The briquets may be advantageously dried over a steam coil to prevent the disintegration of the material as would result if they were permitted to dry slowly without the application of sufficient heat to insure rapid drying.

After the briquets have been thoroughly dried as above described they are treated with a nitrifying agent at a high temperature to reduce the carbonate to a carbo-nitrid compound.

After the material has been thoroughly dried it is subjected to the action of a nitrifying agent such as nitrogen gas, ammonia gas or producer gas and the temperature is raised to from 500° to 1100° C., the degree of temperature being dependent upon the nitrifying agent employed as well as the pressure exerted upon the mass during the operation. When normal atmospheric pressure is employed the temperature of the mass is maintained at a higher degree than when the material is treated under pressure, while the effective treatment of the mass with producer gas or nitrogen gas requires a higher temperature than when ammonia gas is used. When using ammonia gas as a nitrifying agent under a pressure of from 15 to 100 atmospheres I prefer to effect the treatment of the mass at a temperature of from 500° to 700° C., while when using nitrogen gas or producer gas at normal atmospheric pressure I may employ temperatures ranging from 800° to 1100° C.

This treatment is maintained for a sufficient period to effect the reduction of the alkalinous metal carbonate or salt to a carbo-nitrid compound, the exact composition of which is not clearly understood but which probably contains a cyanid or cyanamid of the corresponding alkalinous metal.

When an oxid or carbonate of a catalytically active metal is used in forming the composition the reduction step serves to reduce the oxid or carbonate so that the iron or other metal is deposited throughout the mass and exists in a very finely divided condition, thus increasing the efficiency of the drying agent and also absorbing oxygen if any is present. As previously stated, the nitrifying operation may be performed at atmospheric pressure but I prefer to employ a higher pressure during this operation especially when nitrogen gas or ammonia gas is used as a nitrifying agent, and find that pressures of from 15 to 100 atmospheres are best adapted for use during this operation. The increased pressure, as indicated, allows the operation to be performed at a lower temperature than would otherwise be required, and thus prevents the extreme densification of the product which would result from the use of a higher temperature. The nitrifying operation is performed in an atmosphere of nitrogen or nitrogen bearing gas as producer gas or ammonia gas and oxygen should be excluded during this step in the preparation of the drying agent.

While the material thus formed provides an excellent drier at ordinary atmospheric pressure, I prefer to utilize the same at pressures of approximately 100 atmospheres, as I find that under increased pressure the efficiency of the drier is increased many times.

As previously stated, I find it preferable to employ a carbonate of an alkali or alkali earth metal in the formation of the drying agent, although other oxygen bearing compounds of such metals may be used, and I employ the term "alkalinous" metal carbonate to designate such salts throughout the specification and claims, it being understood that the term is used in its generic sense to cover such salts of alkali or alkali earth metals as may be specifically mentioned herein or may be regarded as equivalents thereof.

During the nitrifying operation above described, the oxygen bearing salt of the alkalinous metal is evidently reduced by the carbon present to form a carbo-nitrid compound of such metal, which, apparently, is in the nature of a cyanid or cyanamid, and while the exact composition of the substance formed is not positively known, I employ the term carbo-nitrid to indicate generally an alkalinous metal compound containing carbon and nitrogen whether such compound contains carbon and nitrogen in the form of a cyanogen radical or otherwise. It will be understood that the finely divided metal employed, being thoroughly mixed with the carbonate prior to the nitrifying operation, will be intimately associated with the carbo-nitrid formed during the reduction of the alkalinous metal salt, and if the metal employed is in the form of an oxid or carbonate the reducing step will result in depositing the metal in finely divided form in a manner to provide a large surface area of contact material for engagement by the gases to be synthesized, thus effectively assisting in the purification of the gases by reason of its affinity for oxygen and water vapor.

As moisture and oxygen are taken up by the drying agent a change is effected in the material, the exact nature of which is unknown, but which probably results in changing a portion of the carbo-nitrid to a carbonate. When the material has deteriorated as a purifying agent to such an extent as to make it desirable, it may be regenerated by passing dry ammonia or nitrogen gas therethrough preferably under pressure and at an elevated temperature, thus giving the material an efficiency as a gas purifier equal or substantially equal to that which it originally possessed.

While I have described with considerable particularity the various steps in the above process as well as the materials to be employed in order that the same may be clear to those skilled in the art, it is to be understood that I do not desire or intend to be limited to the precise details of operation, or the specific substances indicated as preferred, except as such may be specifically included in the following claims which are to be broadly construed in the light of my disclosure.

Having described my invention, what I claim is:

1. In a process for the synthetic production of ammonia the step which comprises passing the gases to be synthesized into contact with an alkalinous carbo-nitrid compound to remove moisture therefrom preparatory to the synthesis of ammonia from said gases.

2. In a process for the synthetic production of ammonia the step which comprises passing the gases to be synthesized into contact with an alkalinous carbo-nitrid compound intimately associated with finely divided iron to remove impurities therefrom preparatory to the synthesis of ammonia from said gases.

3. In a process for the synthetic production of ammonia the step which comprises passing the gases to be synthesized into contact with a carbo-nitrid reduction product of an alkalinous metal salt to remove impurities therefrom preparatory to the synthesis of ammonia from said gases.

4. In a process for the synthetic production of ammonia the step which comprises passing the gases to be synthesized into contact with a carbo-nitrid reduction product of an alkalinous metal salt intimately associated with finely divided iron to remove impurities therefrom preparatory to the synthesis of ammonia from said gases.

5. In a process for the synthetic production of ammonia the step which comprises, passing the gases to be synthesized into contact with a purifying agent formed by heating a mixture of an alkalinous metal carbonate and iron in the presence of a reducing agent and a nitrogen bearing gas, for removing impurities from said gases preparatory to the synthesis of ammonia therefrom.

6. In a process for the synthetic production of ammonia the step which comprises, passing the gases to be synthesized into contact with a purifying agent formed by reducing an alkalinous metal carbonate in the presence of iron and a nitrogen bearing gas, for removing impurities from said gases preparatory to the synthesis of ammonia therefrom.

7. In a process for the synthetic production of ammonia the step which comprises passing the gases to be synthesized into contact with a purifying agent formed by heating a mixture of an alkalinous metal oxygen bearing salt and iron in the presence of a reducing agent, for removing impurities from the gases preparatory to the synthesis of ammonia therefrom.

8. In a process for the synthetic production of ammonia the step which comprises passing the gases to be synthesized into contact with a purifying agent formed by reducing an alkalinous metal oxygen bearing salt in the presence of iron and a nitrogen bearing gas, to remove impurities from said gases preparatory to synthesizing ammonia therefrom.

9. In a process for the synthetic production of ammonia the steps comprising passing the gases to be synthesized into contact with an alkalinous carbo-nitrid compound to remove moisture therefrom, synthesizing ammonia from said gases, and effecting the regeneration of said compound at intervals during the synthesizing operation by passing ammonia gas thereover.

10. In a process for the synthetic production of ammonia from its elements the steps comprising, passing the elemental gases into contact with a carbo-nitrid reduction product of an alkalinous metal salt to remove impurities therefrom, synthesizing ammonia from said gases and effecting the regeneration of said reduction product at intervals during the synthesizing operation by passing ammonia gas thereover.

11. In a process for the synthetic production of ammonia from its elements the steps comprising, passing the elemental gases into contact with an alkalinous carbo-nitrid compound intimately associated with finely divided iron to remove impurities therefrom, synthesizing ammonia from said elemental gases, and effecting the regeneration of said compound at intervals during the synthesizing operation by passing ammonia gas thereover.

12. In a process for the synthetic production of ammonia, the steps comprising passing the gases to be synthesized into contact with a carbo-nitrid reduction product of an alkalinous metal salt intimately associated with finely divided iron to remove impurities therefrom, synthesizing ammonia from said gases, and effecting the regeneration of said reduction product at intervals during the synthesizing operation by passing ammonia gas thereover.

13. In a process for the synthetic production of ammonia, the steps comprising passing the gases to be synthesized into contact with a purifying agent formed by heating a mixture of an alkalinous metal carbonate and iron in the presence of a reducing agent and a nitrogen bearing gas for removing impurities from the gases, synthesizing ammonia from said gases; and effecting the regeneration of said purifying agent at intervals during the synthesizing operation by passing ammonia gas thereover.

14. In a process for the synthetic production of ammonia, the steps comprising passing the gases to be synthesized into contact with a purifying agent formed by reducing an alkalinous metal carbonate in the presence of iron and a nitrogen bearing gas for removing impurities from the gases, synthesizing ammonia from said gases, and effecting the regeneration of said purifying agent at intervals during the synthesizing operation by passing ammonia gas thereover.

15. In a process for the synthetic production of ammonia, the steps comprising passing the gases to be synthesized into contact with a purifying agent formed by heating a mixture of an alkalinous metal oxygen bearing salt and iron in the presence of a reducing agent and a nitrogen bearing gas for removing impurities from said gases, synthesizing ammonia from said gases, and effecting the regeneration of said purifying agent at intervals during the synthesizing operation by passing ammonia gas thereover.

16. In a process for the synthetic production of ammonia, the steps comprising passing the gases to be synthesized into contact with a purifying agent formed by reducing an alkalinous metal oxygen bearing salt in the presence of iron and a nitrogen bearing gas for removing impurities from said gases, synthesizing ammonia from said gases, and effecting the regeneration of said purifying agent at intervals during the synthesizing operation by passing ammonia gas thereover.

17. In a process for the synthetic production of ammonia, the steps comprising subjecting the gases to be synthesized to high pressure and passing them while under high pressure into contact with an alkalinous carbo-nitrid compound to remove moisture therefrom preparatory to synthesizing ammonia from said gases.

18. In a process for the synthetic production of ammonia, the steps comprising subjecting the gases to be synthesized to high pressure and passing them while under high pressure into contact with an alkalinous carbo-nitrid compound intimately associated with finely divided iron to remove impurities from said gases preparatory to synthesizing ammonia therefrom.

19. In a process for the synthetic production of ammonia, the steps comprising subjecting the gases to be synthesized to high pressure and passing them while under high pressure into contact with a carbo-nitrid reduction product of an alkalinous metal salt to remove impurities therefrom preparatory to synthesizing ammonia from said gases.

20. In a process for the synthetic production of ammonia, the steps comprising subjecting the gases to be synthesized to high pressure and passing them while under high pressure into contact with a carbo-nitrid reduction product of an alkalinous metal salt intimately associated with finely divided iron to remove impurities therefrom preparatory to synthesizing ammonia from said gases.

21. In a process for the synthetic production of ammonia, the steps comprising subjecting the gases to be synthesized to high pressure and passing them while under high pressure into contact with a purifying agent formed by heating a mixture of an alkalinous metal carbonate and iron in the presence of a reducing agent and a nitrogen bearing gas for removing impurities from the gases preparatory to synthesizing ammonia therefrom.

22. In a process for the synthetic production of ammonia, the steps comprising subjecting the gases to be synthesized to high pressure and passing them while under high pressure into contact with a purifying agent formed by reducing an alkalinous metal carbonate in the presence of iron and a nitrogen bearing gas for removing impurities from the gases preparatory to synthesizing ammonia therefrom.

23. In a process for the synthetic production of ammonia, the steps comprising subjecting the gases to be synthesized to high pressure and passing them while under high pressure into contact with a purifying agent formed by heating a mixture of an alkalinous metal oxygen bearing salt and iron in the presence of a reducing agent and a nitrogen bearing gas, for removing impurities from the gases preparatory to synthesizing ammonia therefrom.

24. In a process for the synthetic production of ammonia, the steps comprising subjecting the gases to be synthesized to high pressure and passing them while under high pressure into contact with a purifying agent formed by reducing an alkalinous metal oxygen bearing salt in the presence of iron and a nitrogen bearing gas, for removing impurities from the gases preparatory to synthesizing ammonia therefrom.

25. In a process for the synthetic production of ammonia, the steps comprising, subjecting the gases to be synthesized to high pressure and passing them while under high pressure into contact with a purifying agent formed by reducing an alkalinous metal oxygen bearing salt in the presence of a less basic metal and a nitrogen bearing gas to remove impurities from said gases preparatory to synthesizing ammonia therefrom.

In testimony whereof I have affixed my signature.

JOHN COLLINS CLANCY.